United States Patent [19]

Carder

[11] Patent Number: 5,146,287
[45] Date of Patent: Sep. 8, 1992

[54] SLANT ANGLE LASER SCANNER

[75] Inventor: Bruce M. Carder, Rancho Palos Verdes, Calif.

[73] Assignee: Northrop Corporation, Hawthorne, Calif.

[21] Appl. No.: 424,859

[22] Filed: Oct. 20, 1989

[51] Int. Cl.⁵ .................. G01C 3/08; G01B 11/26; G08B 23/00
[52] U.S. Cl. .......................... 356/5; 356/141; 340/984
[58] Field of Search .............. 356/5, 141, 152; 340/984

[56] References Cited

U.S. PATENT DOCUMENTS

| | | | |
|---|---|---|---|
| 3,278,753 | 10/1966 | Pitts et al. | 356/5 |
| 4,290,043 | 9/1981 | Kaplan | 356/5 |
| 4,324,491 | 4/1982 | Hueber | 356/152 |
| 4,326,799 | 4/1982 | Keene et al. | 356/152 |
| 4,518,254 | 5/1985 | Penny et al. | 356/5 |
| 4,690,551 | 9/1987 | Edwards et al. | 356/5 |
| 4,755,818 | 7/1988 | Conrad | 349/961 |

Primary Examiner—Stephen C. Buczinski
Attorney, Agent, or Firm—Terry J. Anderson; Robert B. Block

[57] ABSTRACT

A slant angle laser scanner for detecting underwater hazards, particularly those having a long axis along a radial from the ship such as torpedoes, using a laser, an electro-optical scanner and a rotatably mounted mirror to scan the ocean surface with optical beams at a low angle of incidence to form a circular pattern of radial scans surrounding the ship. The time of return of reflections can be measured to determine the depth of the hazard and the element illuminated within the liner array of photosensitive detectors indicates the location of the hazard along the radial scan. A boresight detector is used to detect the reflections and determine location and depth of the hazard.

10 Claims, 1 Drawing Sheet

SLANT ANGLE LASER SCANNER

BACKGROUND OF THE INVENTION

1. Field of the Invention

This invention relates to techniques for protection of ships from hazardous underwater water objects including mines and torpedoes. This invention particularly relates to techniques for scanning for such hazardous objects with laser beams.

2. Description of the Prior Art

Conventional techniques for detecting for hazardous objects at sea have limited detection range and therefore do not provide sufficiently early warning of the presence of hazards to permit adequate defensive measures to be taken. Conventional techniques often require the use of elevated devices separated from the ship, such as aircraft, kites, balloons or other elevated platforms to extend the range for detection.

Some laser beam scanning techniques have been developed for underwater hazard detection which use low angle pulsed laser beams, but these suffer the difficulties associated with short-pulse, very high repetition rate lasers using pulsed gating for scanning.

In U.S. Pat. No. 4,690,551, LASER RADAR UTILIZING PULSE TONE WAVEFORM, Edwards et al. disclose a laser radar system including both a pulsed laser and a CW laser. An acousto-optic angular multiplexer is used to provide a frequency and angle shifted beam. A scanner and pointing mirror are used to move the beam at the target.

In U.S. Pat. No. 4,326,799, ACTIVE-PASSIVE SCANNING SYSTEM. Keene et al. disclose a scanning system for use on an aircraft platform which, in the active mode, scans a laser beam with a rotating wedge in a downward looking Palmer pattern.

In U.S. Pat. No. 4,755,818, AIRCRAFT COLLISION WARNING SYSTEM, Conrad discloses an aircraft warning collision system which uses a low power pulsed laser system to project narrow bandwidth radiation in a circular field about the aircraft to detect airborne hazards.

In U.S. Pat. No. 4,324,491, DUAL MODE GUIDANCE SYSTEM. Hueber discloses a laser scanning system for aircraft which utilizes a circular scan.

In U.S. Pat. No. 4,290,043, METHOD OF AND SYSTEM FOR DETECTING MARINE OBSTACLES, Kaplan discloses a marine obstacle avoidance system including an optical transmitter and receiver. An optical beam is transmitted from the ship at a low angle of incidence to the water line and reflections active an alarm.

Such conventional approaches do not adequately provide detection at a sufficient standoff distance from the ship, nor sufficient identification of the hazard, to locate and track the hazard with the precision required by defensive devices to ensure termination of the hazard.

SUMMARY OF THE INVENTION

The preceding and other shortcomings of the prior art are addressed and overcome by the present invention that provides, in a first aspect, a slant angle laser scanner for detecting underwater hazards from an ocean platform having a means for generating a laser beam, means for radially scanning the optical beam from a first point on the ocean surface at a first distance from the platform to a second point at a second distance from the platform, means for detecting reflections of the scanned beam from underwater hazards. In a further aspect, the invention provides means to form a circular pattern of radial scans surrounding the platform.

In another aspect, the invention provides a method for detecting underwater hazards from an ocean platform by generating an optical beam, radially scanning the optical beam from a first point on the ocean surface at a first distance from the platform to a second point at a second distance from the platform, then detecting reflections of the scanned beam from underwater hazards. In a further aspect, the invention provides a method of forming a circular pattern of radial scans surrounding the platform.

These and other features and advantages of the present invention will become further apparent from the detailed description and accompanying figures that follow. In the description and figures, the same numerals are used to refer to the same features throughout.

DETAILED DESCRIPTION OF THE PREFERRED EMBODIMENT(S)

Figure 1:
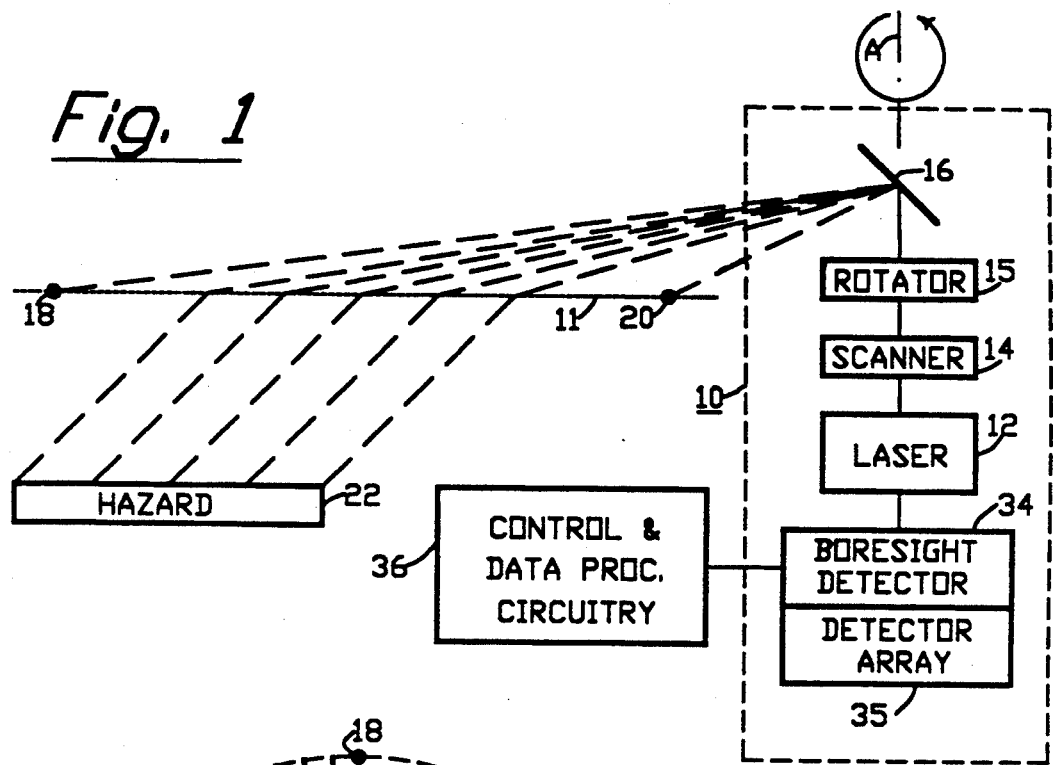
FIG. 1 is an illustration of a slant angle laser scanner according to the present invention.

FIG. 1 is an illustration of slant angle laser scanner 10 according to the present invention. Slant angle laser scanner 10 is mounted on a ship or other platform, not shown, with line of sight access to Ocean surface 11. During operation, a circular pattern of laser beam scans will be created surrounding slant angle laser scanner 10 in order to detect floating or submerged hazards, such as hazard 22.

Figure 2:
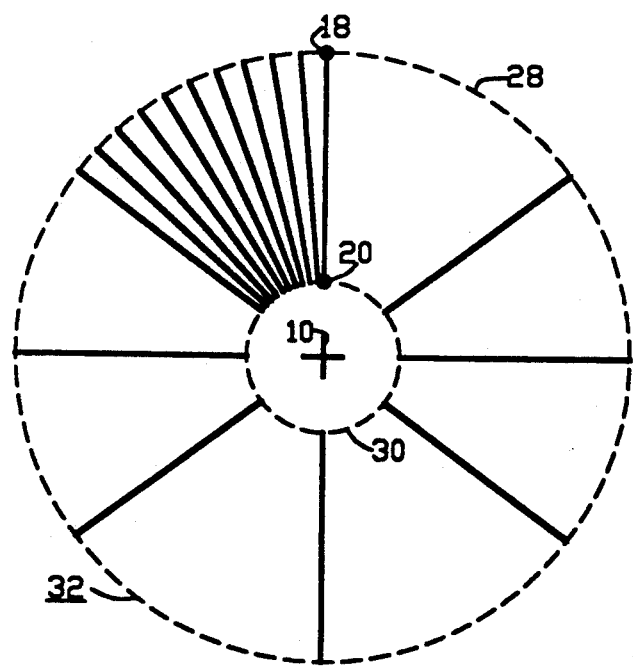
FIG. 2 is a plan view of an illustrative circular scanning pattern according to the present invention.

A single scan is illustrated in FIG. 1 in which the optical beam from slant angle laser scanner 10 strikes ocean surface 11 first at most distant point 18 and continues moving inward toward slant angle laser scanner 10 until terminated at closest point 20. A more complete pattern of scans, showing the circular nature of the scan pattern, is illustrated in FIG. 2 and discussed below in greater detail with reference to that figure.

Slant angle laser scanner 10 includes narrow beam, continuous wave (CW) Or long pulse laser 12 which provides a beam of laser light to electro-optical scanner 14. Laser 2 operates in the blue and/or green spectrum to match the transmission in the blue and/or window of the ocean. Laser 12 may operate with a single wavelength, or it can be two or more wavelengths. For example, an argon laser may conveniently be operated at its two strong wavelengths, namely 488 and 514.5 nanometers. Another useful laser would be a double YAG laser operating at 532 nanometers.

Electro-optical scanner 14 serves to vary slightly the angle of incidence of the scanning beam applied to mirror 16 in order to vary the angle of incidence of the optical beam from mirror 16 which intersects ocean surface 11. That is, electro-optical scanner 14 serves to move the scanned beam from most distant point 18 to closest point 20 at the speed of light for each scan.

Electro-optical scanner 14 may conveniently be a potassium di-duterium phosphate (KD*P) electro-optical scanner, available for example from Inrad Inc. of North Vale, N.J., or Intra Action of Bellwood, Ill. Electro-optical scanner 14 may conveniently scan a range of 10 to 20 milliradians with a 1 cm. beam and have a rise time variable from about 30 nanoseconds to over 1 microsecond depending upon the radial length of the scan pattern desired.

Mirror 16 is mounted for rotation about axis A which is generally normal to ocean surface 11. The rotation of mirror 16 about axis A is controlled by rotator 15 which may be any conventional mechanical means of controllably rotating mirror 16. Rotator 15 is coordinated with laser 12 and electro-optical scanner 14 so that mirror 16 is rotated a small amount during the time periods between pulses of laser 12. During the pulses, the beam from laser 12 is moved by electro-optical scanner 14 from most distant point 18 to closest point 20.

As shown in FIG. 2, this controlled scan and rotation results in circular scan pattern 32 surrounding the ship with a series of straight line scan segments from most distant arc 28, connecting all most distant points 18, to closest arc 30, connecting all closest points 20. For clarity, only a few of these segments are illustrated in FIG. 2.

Returning now to FIG. 1, slant angle laser scanner 10 also includes boresight detector 34 and linear detector array 35. Boresight detector 34 is a telescopic detector capable of focussing a spot on ocean surface 11 onto an element of linear detector array 35.

Linear detector array 35 includes a linear array of photosensitive detector elements in order to provide more detail about hazard 22. A linear array of photosensitive detector elements is particularly useful for pulse durations of greater than about 30 nanoseconds in order to provide better contrast on each array element. Each such detector element may cover a certain predetermined portion of the scan between most distant point 18 and closest point 20.

Boresight detector 34 is aligned with the boresight from laser 12 to mirror 16 to detect reflections from circular scan pattern 32. Boresight detector 34 and linear detector array 35, as well as the other components of slant angle laser scanner 10 are connected to and controlled by control and data processing circuitry 36. Appropriate filters, not shown, are used to transmit the laser beam while filtering out undesired light, such as sunlight.

The operation of a typical configuration of slant angle laser scanner 10 using a long pulse laser, in the range for example of 30 nanoseconds to 1 microsecond, may now be described. At some instant of time, mirror 16 is located in a first position by rotator 15. Laser 12 emits an optical beam which passes relatively unchanged through electro-optical scanner 14, strikes mirror 16 and is reflected to ocean surface 11 at a low angle of incidence, striking ocean surface 11 at most distant point 18.

While mirror 16 is in this first position, electro-optical scanner 14 changes the angle the beam strikes mirror 16 and moves the beam from most distant point 18 to closest point 20 at the speed of light On ocean surface 11. The pulse from laser 12 is terminated when the optical beam strikes closest point 20.

Thereafter, rotator 15 moves mirror 16 to a second position and laser 12 is pulsed again and emits another optical beam. This beam strikes ocean surface 11 at another most distant point 18 on most distant arc 28 and is then scanned by electro-optical scanner 14 until the pulse is terminated when the beam strikes another closest point 20 on closest arc 30. The scan and rotate operation may be continued until circular scan pattern 32, or a variation thereof, is formed. It may in fact be convenient to continue the scan and rotate operation continually to maintain a watch for such underwater hazards.

When the optical beam strikes ocean surface 11 it is refracted at some angle and penetrates the ocean. If the beam strikes an object on ocean surface 11 or under ocean surface 11 detectable reflections will occur.

Any reflections from an object such as hazard 22 will strike mirror 16 and be applied to boresight detector 34. It is important to note that all reflections from the same depth in the ocean will arrive at boresight detector 34 at the same time. In this way, the depth of hazard 22 beneath ocean surface 11 may be determined by control and data processing circuitry 36. In addition, the back scatter from the beam striking the ocean surface will also arrive at a time corresponding to its depth, that is, ocean surface 11, so that such back scatter can easily be distinguished from the relatively weaker reflections of interest.

Slant angle laser scanner 10 is particularly sensitive to hazards which have a substantial axis along the path between most distant point 18 and closest point 20. That is, long objects extending along a radial line from the ship. This feature is particularly useful in detecting incoming torpedoes which, of course, fit this profile exactly and may be even more easily located by this technique if they leave a trail of highly reflecting bubbles.

Slant angle laser scanner 10 therefore provides excellent hazard detection from a useful standoff distance in a circular pattern around axis A including information concerning the shape, depth and angle of attack of hazards. The time of return of reflections can be measured to determine the depth of the hazard and the element illuminated within the linear array of photosensitive detectors indicates the location of the hazard along the radial scan. Repetitive scanning to determine the change of position of hazard 22 between scans can easily be used to determine the speed of approach of the hazard.

While this invention has been described with reference to its presently preferred embodiment, its scope is not limited thereto. Rather, such scope is only limited insofar as defined by the following set of claims and includes all equivalents thereof.

I claim as my invention:

1. A slant angle laser scanner for detecting underwater objects from an ocean platform, comprising
   means forming a collimated laser beam,
   electro-optical means positioned to receive said laser beam and for scanning the beam along a series of radial paths centered at the platform, each of which proceeds from a location removed from the platform and works toward a location nearer the platform,
   means for moving the direction of scan progressively in azimuth after each radial scan, and
   means for gating the imaging signals to discriminate against sea surface echo and to determine the depth of said underwater objects.

2. The slant angle laser scanner claimed in claim 1, wherein the scanning means further comprises:
   a rotatably mounted optical mirror for reflecting the optical beam from the laser means to the ocean surface;
   means for creating pulses of the optic beam;
   electro-optic scanning means for varying the angle of reflection of the optical beam; and means for rotating the mirror.

3. The slant angle laser scanner claimed in claim 1, wherein the detecting means further comprises:
a linear array of photosensitive detector elements.

4. The slant angle laser scanner claimed in claim 1, wherein the detecting means is mounted along the boresight of the laser means.

5. A method for slant angle laser scanning for detecting underwater objects from an ocean platform, comprising
forming a collimated laser beam,
electro-optically scanning the beam along a series of radial paths centered at the platform, each of which proceeds from a location removed from the platform and works toward a location nearer the platform,
moving the direction of scan progressively in azimuth after each radial scan, and
gating the imaging signals to discriminate against sea surface echo and to determine the depth of said underwater objects.

6. The method of detecting underwater hazards claimed in claim , wherein the scanning step further comprises:
forming a circular pattern of radial scans surrounding the platform.

7. The method of detecting underwater hazards claimed in claim 6, wherein the scanning step further comprises:
reflecting the optical beam from the laser means to the ocean surface; and
varying the angle of reflection of the optical beam to radially scan the optical beam at the speed of light.

8. The method of detecting underwater hazards claimed in claim 7, wherein the optical beam is generated in pulses and the scanning step further comprises:
rotating the scanned beam about an axis normal to the ocean surface between the pulses and then:
radially scanning the beam during the pulses.

9. The method of detecting underwater hazards claimed in 5 wherein the reflection detecting step further comprises:
focussing the reflection on elements of a linear array of photosensitive detector elements to determine the location of the hazard along the radial scan.

10. The method of detecting underwater hazards claimed in 5 wherein the reflection detecting step further comprises:
determining the depth of the hazard from the time of arrival of the reflection.

* * * * *